United States Patent [19]

Biasini

[11] 4,407,182
[45] Oct. 4, 1983

[54] MUSICAL INSTRUMENT STAND
[75] Inventor: Americole R. Biasini, Bellingham, Wash.
[73] Assignee: Allsop, Inc., Bellingham, Wash.
[21] Appl. No.: 310,036
[22] Filed: Oct. 9, 1981
[51] Int. Cl.³ .............................................. G10G 5/00
[52] U.S. Cl. .................................... 84/453; 84/385 A; 84/387 A; 248/170; 248/309 A
[58] Field of Search ................. 84/280 C, 327, 385 A, 84/387 A, 453; 248/170, 309.2, 528

[56] References Cited
U.S. PATENT DOCUMENTS

| | | | |
|---|---|---|---|
| 496,851 | 5/1893 | Bunker et al. | 248/170 |
| 645,527 | 3/1900 | Latourell et al. | 248/170 |
| 838,649 | 12/1906 | Rockwell | 84/280 C |
| 1,144,726 | 6/1915 | Robinson et al. | 248/170 |
| 1,448,171 | 3/1923 | Waderlow | 248/170 |
| 2,901,860 | 9/1959 | Crawford | 84/387 A |
| 2,920,851 | 1/1960 | Carlini | 84/453 X |

Primary Examiner—Lawrence R. Franklin
Attorney, Agent, or Firm—Hughes, Barnard & Cassidy

[57] ABSTRACT

A musical instrument support stand, adapted for storage substantially entirely within the hollow end of the musical instrument during periods of non-use, is comprised of a base including a tripod, a post secured at one end to the base and having a free distal end for projection within the interior of the musical instrument, and a musical instrument support received on the post and adjustable over the length thereof, wherein the outer geometry of the instrument support is complementary to the inner geometry of the musical instrument whereby the latter may be received by the former and supported thereon.

18 Claims, 5 Drawing Figures

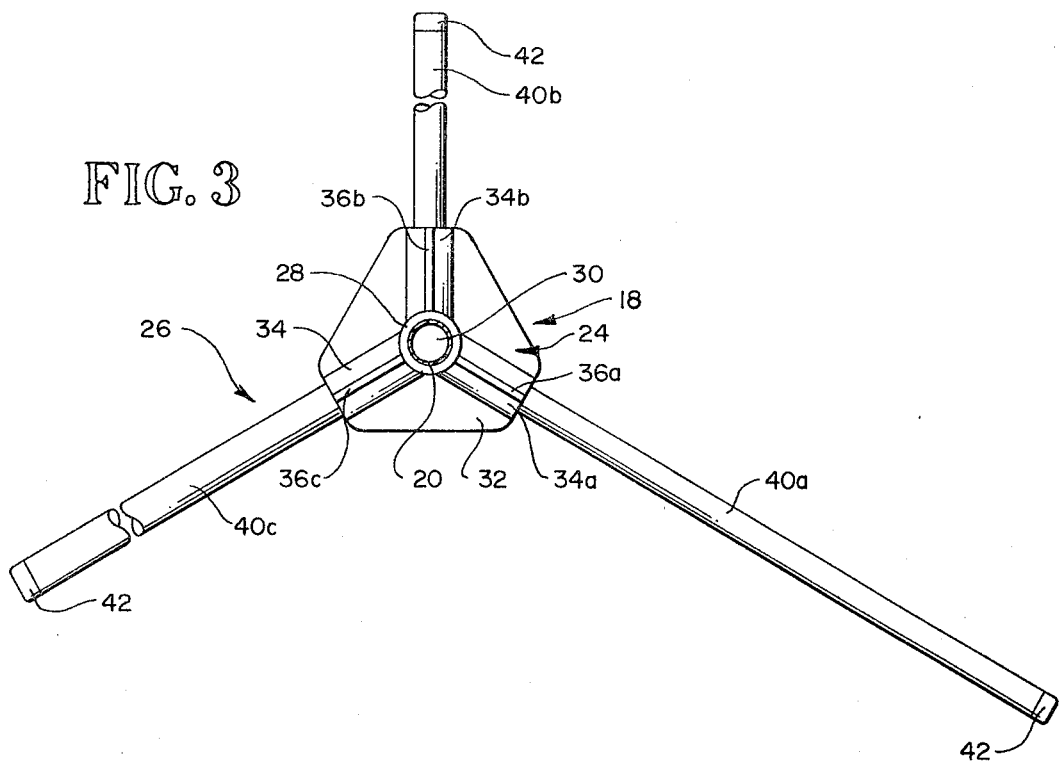

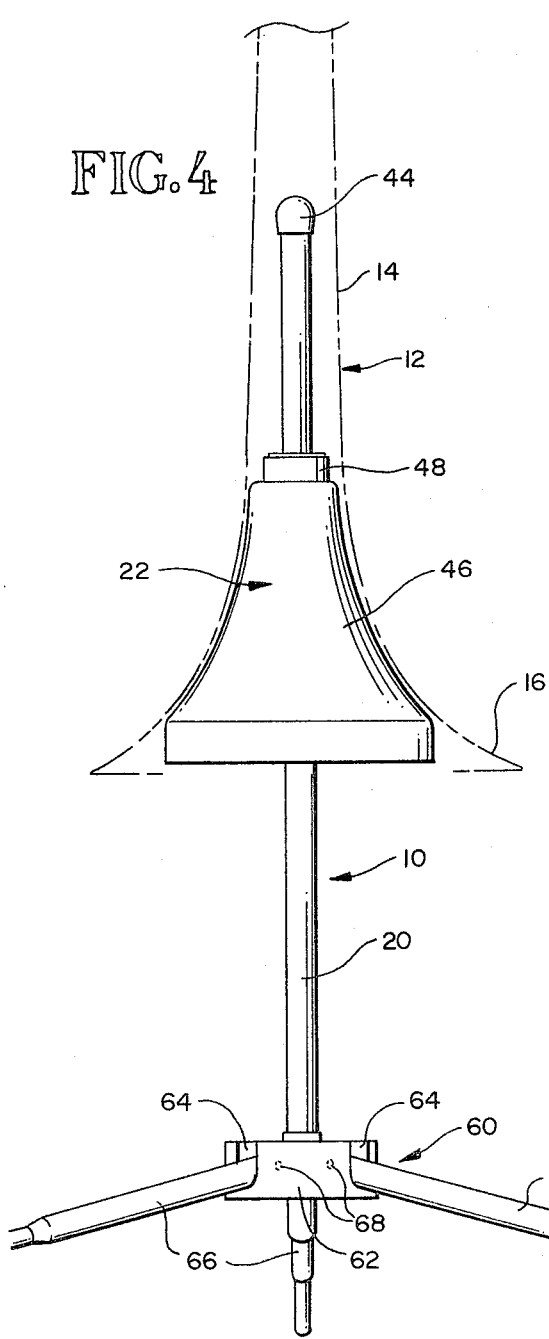
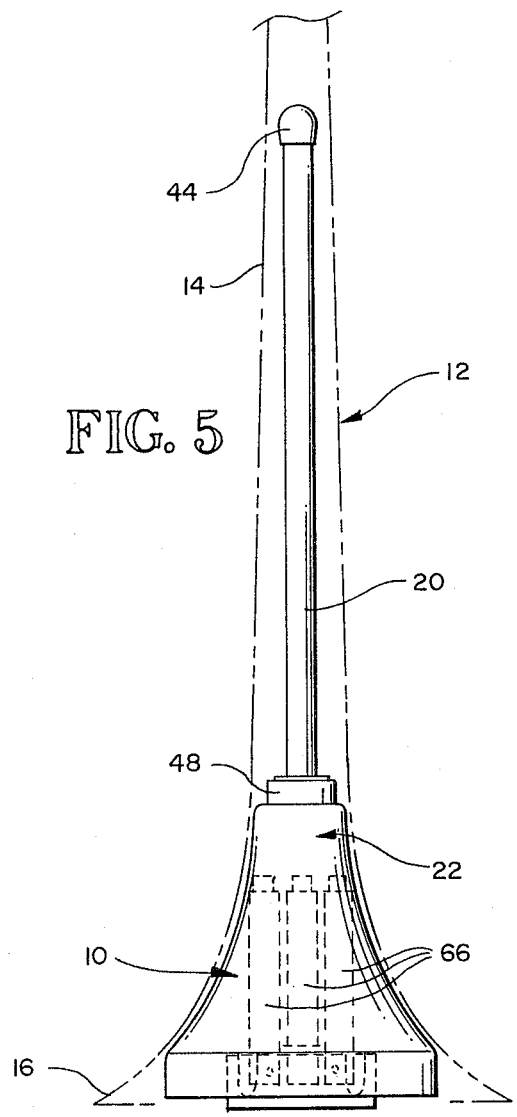

MUSICAL INSTRUMENT STAND

BACKGROUND OF THE INVENTION

1. Field of the Invention

The present invention relates generally to a musical instrument support stand and, more especially, to one which may be stored substantially entirely within the hollow end of the musical instrument during periods of non-use. The instrument stand of the present invention is most advantageously employed for supporting brass instruments having bell-shaped ends, such as, for example, trumpets, fluegelhorns and trombones.

2. Description of the Prior Art

It is fairly commonplace for a band musician to play a number of different instruments and, accordingly, have the need to support one or more unused musical instruments during a performance. There are commercially available support stands for this purpose. One type of stand is comprised of a base and a generally cone-shaped support piece that fits within the bell end of the instrument. Usually the stand is collapsible so that it can fit within the carrying case for the instrument. Exemplary of such instrument stands for a clarinet are U.S. Pat. Nos. 1,888,927 and 3,203,298, while U.S. Pat. No. 2,920,851 shows a similar arrangement for supporting a cornet.

The prior art devices disclosed in the aforementioned patents are suitable for supporting musical instruments. However, a substantial drawback to each is that they must be stored apart from the instrument, either within the same case or in a separate one. There is one commercially available support stand particularly adapted for supporting a clarinet which is capable of storage within the bell end of that instrument. This device includes a tripod secured directly to a tapered support member adapted to be disposed within the bell of the clarinet to support the instrument. During periods of non-use and for purposes of storage, the tripod is removed from the tapered support member, folded and collapsed so that the legs project within the interior thereof, and is then secured to the support in that position. Although this approach offers advantages over the patented devices mentioned above, it still lacks versatility in use.

Consequently, the need exists to provide a versatile, easily collapsible musical instrument support stand which may be stored within the bell end of the instrument during periods of non-use.

SUMMARY OF THE INVENTION

The musical instrument support stand of the present invention advantageously provides a sturdy support for a musical instrument and one which may be stored substantially entirely within the instrument during periods of non-use. The support stand of the present invention also provides the advantage of being vertically adjustable in order to support the musical instrument at a height most convenient to the musician.

These and other advantages of the present invention are realized by providing a base member for supporting the stand, a post secured at one end to the base and having a free distal end for projection within the interior of the musical instrument to be supported, and a tapered or somewhat conical instrument support member received on the post and vertically adjustable over the length thereof. The base includes a tripod which, during periods of non-use, may be stored entirely within the stand itself which, in turn, is received substantially entirely within the end of the instrument. In one preferred form, the tripod is comprised of nestable tubular legs which can be stored inside the post; in another preferred form the tripod is comprised of pivotable telescopic legs.

Other advantages of the present invention will become apparent to those skilled in the art upon examination of the following detailed description taken in conjunction with the figures of drawing, wherein:

BRIEF DESCRIPTION OF THE DRAWINGS

FIG. 3 is a view taken substantially along the line 3—3 of FIG. 2;

FIG. 4 is a side elevational view of an alternate embodiment of a musical instrument support stand in accordance with the present invention; and, FIG. 5 is a view similar to FIG. 2, showing the support stand of FIG. 4 in a closed, collapsed configuration for storage.

DETAILED DESCRIPTION OF THE INVENTION

In order to describe the present invention in detail, the same will be made with reference to certain preferred embodiments thereof. However, those skilled in the art will appreciate that these preferred embodiments are meant to be illustrative only and not limitative of the scope of this invention.

Figure 1:
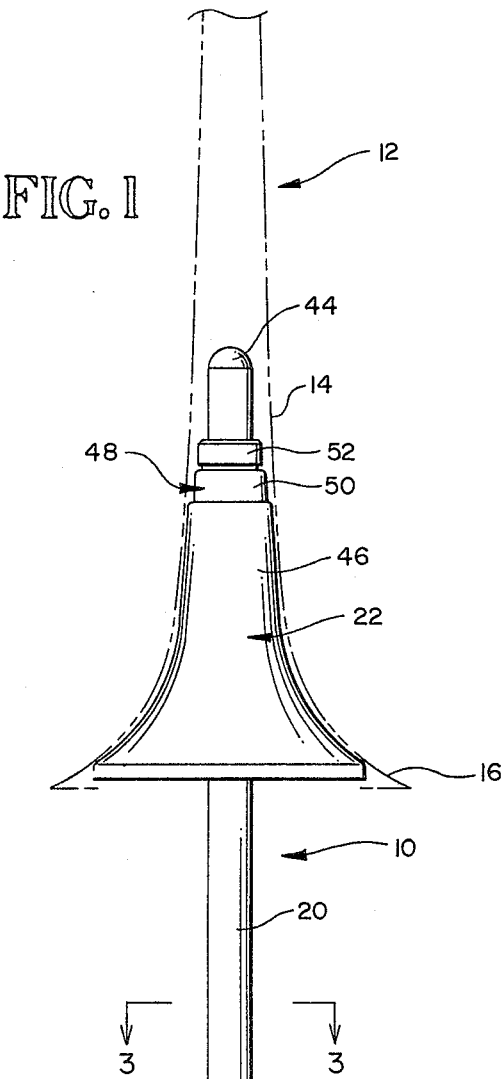
FIG. 1 is a side elevational view of one embodiment of a musical instrument support stand in accordance with the present invention, shown supporting a musical instrument in phantom lines.

Referring to the Figures of Drawing, in all of which like parts are designated with like reference numerals, a preferred embodiment of the musical instrument support stand of the present invention, designated generally as 10, is shown in FIG. 1 supporting a musical instrument designated generally as 12. The stand 10 is specifically adapted for supporting a brass instrument such as a trumpet, fluegelhorn, trombone, or the like. These instruments customarily include an outwardly tapering, generally conical tubular wall 14 which terminates in a somewhat bell-shaped end 16. The stand 10, as shown in FIG. 1, includes a base portion designated generally as 18, an upstanding post 20 which can project within instrument 12 and a musical instrument support means designated generally as 22 for receiving and supporting the instrument while the musician is playing another one.

Figure 2:
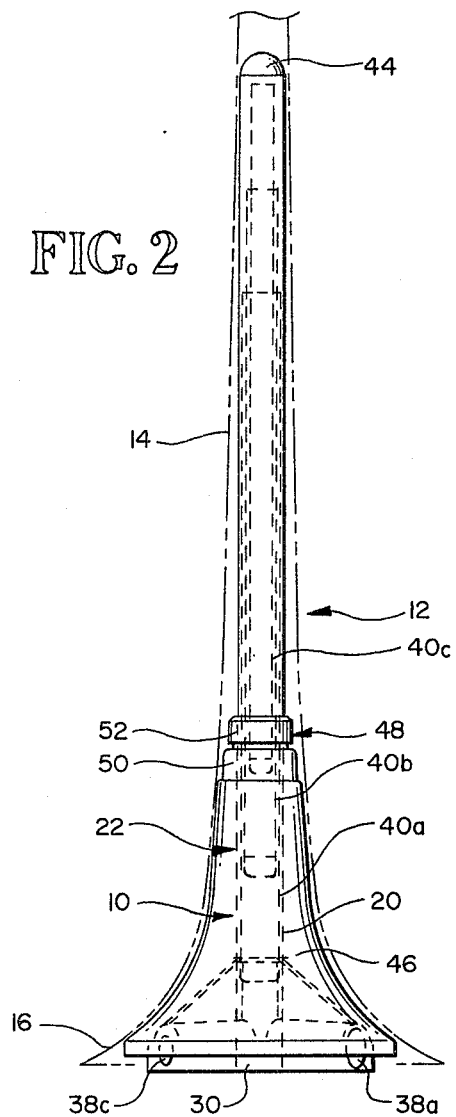
FIG. 2 is a side elevational view of the stand shown in FIG. 1, but in a closed, collapsed configuration for storage within the instrument.

In the embodiment shown in FIGS. 1–3, base means 18 is comprised of a central hub member 24 which serves to support the post 20 and also comprises a portion of a tripod designated generally as 26. The hub 24, preferably fabricated from molded polymeric material, includes a center column 28 of generally cylindrical form having an internal bore or hollow shaft 30, best viewed in FIG. 3. A base plate 32 is formed at the lower end of column 28 and includes, in the preferred embodiment shown, three radially projecting cylindrical socket members 34a, 34b and 34c spaced equiangularly (i.e., 120° apart) about the plate 32. Generally triangular walls 36a, 36b and 36c join the central column 28 with each of the sockets 34 and act as stiffening webs to rigidify the hub 24. Each of the sockets 34 includes a central bore 38a, 38b and 38c, respectively, for receiving a tripod leg 40a, 40b and 40c respectively. In this preferred embodiment, each of the tripod legs is a tubular leg, preferably terminating in a cap or plug 42. Preferably, the caps or plugs 42 are fabricated from a resilient material, such as plastic or synthetic rubber, to provide a closure means for the tubular legs and also a slight amount of frictional engagement with the floor when the support stand 10 is in use. It is also preferred that the axes of the sockets 34 have a slight downward inclination or pitch with respect to the horizontal (e.g., 2°–5°) to give a suitable pitch to the tripod legs 40 to improve stability when the stand is in use.

In the assembled configuration shown in FIG. 1, post 20 is received interiorly of the column 28 on hub 24 in an interference fit relationship. Post 20 may be secured on the hub 24 in any of a number of other ways—the upper end of column 28 could have a reduced outer diameter stepped from a shoulder and a suitable portion project interiorly of the shaft 30 in an interference fit or, by suitable selection of materials, the post and hub could be autogenously welded or adhesively secured together—provided a continuous internal cavity is presented through the hub 24 leading into the interior of tubular post 20.

Each of the tubular leg members 40 in the embodiment shown in FIGS. 1–3 is of a progressively smaller diameter and, in turn, the largest of the three legs 40 is smaller than the inner diameter tubular post 20. More specifically, and by way of example, leg 40a is selected to have an outer diameter smaller than the inner diameter of post 20, leg 40b is chosen to have an outer diameter less than the inner diameter of leg 40a, and leg 40c is likewise chosen to have an outer diameter less than the inner diameter of leg 40b. Accordingly, when the support stand 20 is not in use, the legs 40 comprising the tripod 26 may be removed from the sockets 38, inserted one within the other in a nested fashion and be stored internally of post 20 as shown in FIG. 2.

The post 20 terminates, at its upper end, in a closure cap or plug 44 preferably made from a soft plastic or synthetic rubber material. Closure plug 44 prevents the free distal end of post 20 from scratching or otherwise damaging the interior of the musical instrument 12 and also prevents the leg members 40 from doing the same when the stand is in its collapsed configuration shown in FIG. 2. The length of post 20 can vary, the range being limited by the depth of the throat of the instrument 12 which is to be received on the stand 10.

Adjustable instrument support means 22 is received in sliding engagement on the post 20 for supporting the musical instrument 12 when the musician is playing a different one. The support 22 is adjustable over the length of the post 20 so that the instrument 12 can be placed at a height convenient for the musician. The support means 22 is preferably a hollow, generally conical or tapered support having a wall 46 which flares outwardly and downwardly. The support 22 is preferably made from a polymeric material which will not damage the interior of the instrument 12 when inserted in its bell end 16 as shown in the figures and which is easily molded. The support 22 is designed with an outer geometry complementary to the inner geometry of the instrument to be supported in order that the latter is received very securely. A collet 48, or similar releasable fastener, is secured at the upper end of the support 22 to permit adjustment thereof over the length of post 20.

Collet 48 is comprised of a fixed portion 50 secured to the upper end of wall 46 and a rotatable portion 52 which may be tightened to secure the support 22 or loosened to adjust it to a convenient height for the musician.

In operation, the support stand exemplified in FIGS. 1–3 is simple to assemble and disassemble and provides a very convenient and versatile device. From the storage configuration of FIG. 2, where the entire stand 10 is housed substantially entirely within the instrument 12, the tubular legs 40 are withdrawn from the interior of post 20 and the support 22 raised to a convenient height and secured in that position by means of collet 48. The legs 40 are then placed within the appropriate sockets 38 and the stand is ready for use. Disassembly to the storage configuration is achieved simply by reversing these steps.

FIGS. 4 and 5 shown an alternate embodiment of a support stand of the present invention. The embodiment of FIGS. 4 and 5 is identical to that described above with reference to FIGS. 1–3, save for the base means which supports the stand, designated generally as 60 in this alternate embodiment. As best viewed in FIG. 4, base means 60 is comprised of a central hub 62 attached to the lower end of post 20. Hub 62 three notched or U-shaped radial cavities 64 spaced equiangularly thereabout. Three tripod legs 66 are pivotally secured to the hub 62, each being received in a respective channel 64. Preferably, as shown in FIG. 4, the tripod legs 66 are telescoping tubular legs which may be extended during use (FIG. 4) and collapsed to a shorter configuration for storage (FIG. 5). A latching means, such as a spring-loaded pin, 68 is provided to lock the legs 66 in position during use and to permit the same to be pivoted upwardly for the storage configuration illustrated in FIG. 5.

In operation, the alternate embodiment of FIGS. 4 and 5 also provides a simple yet efficient and convenient support stand. From the collapsed, storage configuration shown in FIG. 5, wherein the tripod leg members are compressed, pivoted upwardly and stored interiorly of the hollow support member 22, the support is adjusted to a desired position along post 20 and secured thereon, the legs 66 are pivoted downwardly to a latched position and on thence telescoped to yield the configuration of FIG. 4. When it is desired to collapse the stand 10, the steps are simply reversed. In the collapsed configuration, the stand 10 may be stored within the bell end 16 of the instrument as shown in FIG. 5.

The musical instrument support stand 10 of the present invention, in any of its disclosed embodiments, may be readily fabricated from commonly available and durable materials. The tripod legs and support post are advantageously made from conventional tubing. The hub and instrument support member are preferably fabricated from a polymeric material, ABS plastic being a highly preferred variety. Accordingly, the invention disclosed herein provides a simple yet highly efficient musical support stand which provides all of the advantages of conceptually similar devices known in the art but in a more versatile and compact form.

While the invention has now been described with reference to certain preferred embodiments thereof, the skilled artisan will appreciate that various substitutions, modifications, changes, and omissions may be made without departing from the spirit thereof. Consequently, it is intended that the scope of the present invention be limited solely by that of the following claims.

What is claimed is:

1. A musical instrument support stand adapted for storage substantially entirely within the instrument during periods of non-use, comprising:
   (a) base means for supporting a musical instrument stand;
   (b) post means secured at a first end to said base means and having a free distal end for projection within the interior of a musical instrument, and,
   (c) musical instrument support means received on said post and adjustable over the length thereof, having an outer geometry complementary to the interior geometry of said musical instrument, for supporting receipt of said musical instrument thereon.

2. The support stand of claim 1, wherein said base means includes tripod leg means for supporting said stand and said instrument during periods of use.

3. The support stand of claim 2, wherein said tripod leg means are storable substantially entirely within said musical instrument support stand during periods of non-use.

4. The support stand of claim 2 or 3, wherein said tripod leg means comprise three telescoping legs pivotally received on a hub and releasable locking means for permitting said legs to be pivoted from a folded storage position substantially entirely within a hollow end of said musical instrument support means to an opened support position.

5. The support stand of claim 2 or 3, wherein said tripod leg means comprise three nestable tubes for insertion within three respective bores located equidistant about a hub during periods of use and for nested insertion within said post means during periods of non-use.

6. The support stand of claim 2 or 3, wherein said musical instrument support means includes collet means for permitting adjustment thereof over the length of said post means.

7. The support stand of claim 6, wherein said musical instrument support means is a hollow member having a generally conical configuration for mating engagement within a generally bell-shaped end of said musical instrument.

8. A musical instrument support stand adapted for storage substantially entirely within the hollow interior of a musical instrument, comprising:
   (a) a base having a central generally cylindrical column for receiving a tubular post and securing same in an orientation coincident with the central axis of a musical instrument, and three sockets disposed equiangularly about said column and extending vertically outward therefrom, each of said sockets having an opening for receiving a generally cylindrical tubular leg;
   (b) a tubular post received in said column at its first end and having a free distal end for projection within the hollow interior of said musical instrument;
   (c) a musical instrument support comprising a generally conical support member having an outwardly flaring wall for supporting engagement within the bell end of said instrument, releasably secured to said post and adjustable over the length thereof; and,
   (d) three tubular legs, one of each disposed within a respective one of said sockets, wherein each of said tubular legs is of progressively smaller outer and inner diameters and the outer diameter of the largest diameter leg is smaller than the inner diameter of said tubular post whereby said three legs may be nested one within another and the nested legs disposed within said tubular post.

9. The support stand of claim 8, wherein the axes of said sockets are pitched with respect to the axis of said column, the pitch angle being in the range of from about 2° to about 5°.

10. A musical instrument support stand adapted for storage substantially entirely within the hollow interior of a musical instrument, comprising:
    (a) a base having a hub formed with three generally U-shaped channels spaced equiangularly thereabout, each of said channels being open at the top and outer end;
    (b) a generally cylindrical post secured at its first end to said hub and having a free distal end for projection within the hollow interior of a musical instrument substantially coincident with the central axis thereof;
    (c) a musical instrument support comprising a generally conical support member having an outwardly flaring wall for supporting engagement within the bell end of said instrument, releasably secured to said post and adjustable over the length thereof; and,
    (d) three telescoping tripod legs pivotally secured, one within each of said U-shaped channels, and latching means for locking said legs in an extended supporting configuration and for releasing said legs to an inwardly collapsed configuration wherein the axes of said legs are substantially parallel to the central axis of said instrument.

11. The support stand of claim 10, wherein said conical support member is a hollow support member configured to receive said tripod legs when in an inwardly collapsed configuration.

12. A combination adapted to function as a support stand for a musical instrument and also adapted to be stored in said musical instrument, where the instrument has an interior cavity comprising a bell end with a mouth and an elongate throat extending into the instrument from the mouth, said combination comprising:
    (a) a musical instrument support means adapted to engage the bell end of the instrument to provide support for the instrument, and also adapted to be positioned at the bell end of the instrument in a stowed position,
    (b) a post means adapted to extend into the throat of the instrument in a stored position, and also adapted to engage and support the instrument support means in a support position, said support means being adjustable over the length of said post means,
    (c) a collapsible base member adapted to be positioned in a collapsed position in the interior cavity of the instrument and also adapted to be positioned at a support location to provide support for said post means, whereby the combination can be stowed in the instrument by locating the instrument support means at the bell end of the instrument, with the post means extending into the throat of the instrument and the base means being stored in the instrument, and the combination can be assembled in a support configuration to support the instrument from the instrument support means.

13. The combination of claim 12, wherein said base means includes tripod leg means for supporting said stand and said instrument during periods of use.

14. The combination of claim 13, wherein said tripod leg means are storable substantially entirely within said musical instrument support stand during periods of non-use.

15. The combination of claim 13 or 14, wherein said tripod leg means comprise three telescoping legs pivotally received on a hub and releasable locking means for permitting said legs to be pivoted from a folded storage position substantially entirely within a hollow end of said musical instrument support means to an opened support position.

16. The combination of claim 13 or 14, wherein said tripod leg means comprise three nestable tubes for insertion within three respective bores located equidistant about a hub during periods of use and for nested insertion within said post means during periods of non-use.

17. The combination of claim 13 or 14, wherein said musical instrument support means includes collet means for permitting adjustment thereof over the length of said post means.

18. The combination of claim 17, wherein said musical instrument support means is a hollow member having a generally conical configuration for mating engagement within a generally bell-shaped end of said musical instrument.

* * * * *